(12) United States Patent
Goodman et al.

(10) Patent No.: US 12,468,542 B2
(45) Date of Patent: Nov. 11, 2025

(54) STATE MANAGEMENT WITH DISTRIBUTED CONTROL PLANE

(71) Applicant: Dell Products L.P., Round Rock, TX (US)

(72) Inventors: Bradley K. Goodman, Nashua, NH (US); Joseph Caisse, Burlington, MA (US); Kirk Alan Hutchinson, Londonderry, NH (US); Antony Prabakaran Jayaveeran, Singapore (SG); Kumaresan Pachiappan, Singapore (SG)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 18/341,978

(22) Filed: Jun. 27, 2023

(65) Prior Publication Data

US 2025/0004784 A1    Jan. 2, 2025

(51) Int. Cl.
*G06F 9/4401* (2018.01)
(52) U.S. Cl.
CPC ................... *G06F 9/4401* (2013.01)
(58) Field of Classification Search
CPC ...... G06F 9/4401; G06F 8/70; G06F 11/2247; G06F 11/2289
See application file for complete search history.

(56) References Cited

U.S. PATENT DOCUMENTS

| | | | |
|---|---|---|---|
| 9,154,479 B1* | 10/2015 | Sethi | H04L 63/20 |
| 9,298,371 B1* | 3/2016 | Selvam | G06F 3/0632 |
| 2008/0028395 A1* | 1/2008 | Motta | G06F 8/65 |
| | | | 717/177 |
| 2009/0133014 A1* | 5/2009 | Laurila | G06F 8/60 |
| | | | 717/174 |
| 2017/0054598 A1* | 2/2017 | Adam | H04L 41/5054 |
| 2020/0177554 A1* | 6/2020 | Moore | G06F 8/61 |
| 2020/0186365 A1* | 6/2020 | Kumar | H04L 9/3263 |
| 2021/0157625 A1* | 5/2021 | Sonar | G06F 9/505 |
| 2021/0294595 A1* | 9/2021 | Haynes | G06F 8/658 |
| 2022/0164221 A1* | 5/2022 | Antemijczuk | G06F 9/546 |
| 2023/0168911 A1* | 6/2023 | Lopez Pascual | G06F 9/45558 |
| | | | 718/1 |
| 2024/0020111 A1* | 1/2024 | Han | G06F 8/65 |
| 2024/0362559 A1* | 10/2024 | Lahiri | G06Q 10/06315 |

* cited by examiner

*Primary Examiner* — Hyun Soo Kim
(74) *Attorney, Agent, or Firm* — WOMBLE BOND DICKINSON (US) LLP

(57) ABSTRACT

Methods and systems for manage operation of endpoint devices are disclosed. To manage the operation of endpoint devices, management systems may monitor and update the state of the endpoint devices. To manage incongruencies among state updates and the states of the endpoint devices, the endpoint devices may implement a state management model that vests authority over the true states of the endpoint devices in the endpoint devices. Consequently, the endpoint devices may resolve incongruencies by rejecting some state updates that do not reflect the true states of the endpoint devices.

20 Claims, 8 Drawing Sheets

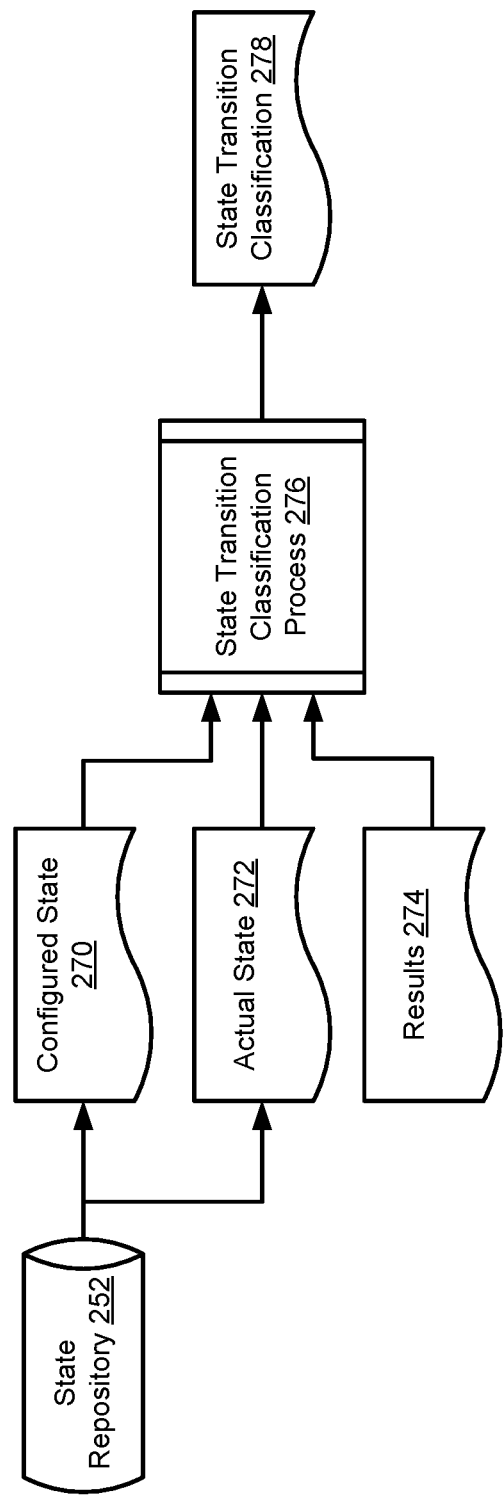

STATE MANAGEMENT WITH
DISTRIBUTED CONTROL PLANE

FIELD

Embodiments disclosed herein relate generally to device management. More particularly, embodiments disclosed herein relate to managing states of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show data flow diagrams in accordance with an embodiment.

DETAILED DESCRIPTION

Figure 1:
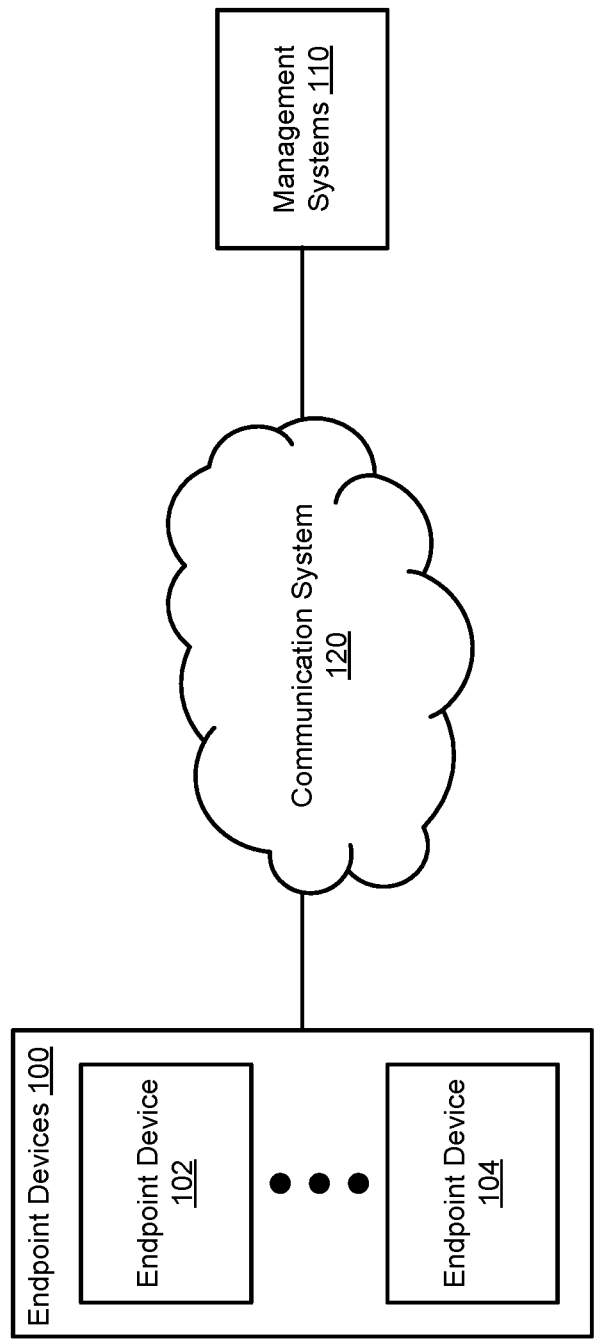
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for distributed management of the operation of endpoint devices. To manage the operation of endpoint devices, a system may include any number of management systems. The management systems may be tasked with managing the operation of the endpoint devices.

To manage the operation of the endpoint devices, the management entities may generate and distribute state updates. The endpoint devices may consume the state updates and attempt to conform their states to the states specified by the state updates.

However, due to limitations on information distribution, the management systems may have stale understandings of the state of the endpoint devices. Consequently, different management systems may generate state updates that are incongruent with each other and with the state of the endpoint devices.

To manage processing of state updates, the endpoint devices and management systems may implement a state management model. The state management model may vest the endpoint devices with authority over the true state of each endpoint device. Consequently, when incongruent state updates are received by the endpoint devices, the endpoint devices may reject the updates rather than process the updates to resolve the incongruences.

By doing so, embodiments disclosed herein may facilitate distributed management of endpoint devices in distributed systems where management entities may lack accurate information regarding the states of managed endpoint devices. Thus, embodiments disclosed herein may address, among others, the technical problem of information distribution in distributed systems. A system in accordance with an embodiment may do so by implementing a state management model that allows for resolution of incongruent state updates.

In an embodiment, a method for managing operation of an endpoint device is provided. The method may include obtaining a desired state update for the endpoint device; making a determination regarding whether a first configured state on which the desired state update is based matches a second configured state of the endpoint device; in a first instance of the determination where the first configured state on which the desired state update is based matches the second configured state of the endpoint device: updating the second configured state based on the first configured state to obtain an updated second configured state; attempting to update an actual state of the endpoint device to match the updated second configured state of the endpoint device to obtain an updated endpoint device; and providing computer implemented services using the updated endpoint device.

The method may also include, in a second instance of the determination where the first configured state on which the desired state update is based does not match the second configured state of the endpoint device: rejecting the desired state update to retain the second configured state; and providing the computer implemented services using the endpoint device in the actual state.

The method may further include obtaining a state transition update based on the attempting to update the actual state of the endpoint device; generating an endpoint side state update based on one or more of the state transition update, the updated second configured state, the actual state, and, in an instance of the attempting to update where the actual state was successfully updated to obtain an updated actual state, the updated actual state; and distributing the state update to a control plane element.

The actual state may reflect states of hardware and/or software components of the endpoint device. The states of the components may be a discrete, finite number of states (e.g., operational, inoperable), continuous (e.g., 38% of nominal operation, 72% of nominal operation), and/or conform to another representational system.

The first configured state may reflect a desired state of hardware and/or software components of the endpoint device.

The endpoint device may include an automation engine adapted to attempt to modify the state of the hardware and/or software components of the endpoint device to match the desired state of the hardware and/or software components of the endpoint device.

The desired state update may specify a change to the first configured state, and the first configured state may be a last known configured state of the endpoint device as known by an entity that generated the desired state update.

The determination may be made based on validation rules that require the last known configured state of the endpoint device as known by an entity that generated the desired state update to reflect the second configuration state of the endpoint device for the desired state update to be a valid update.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system include endpoint devices 100. Each endpoint device (e.g., 102, 104) may provide similar and/or different computer implemented services, and may provide the computer implemented services independently and/or in cooperation with other endpoint devices.

To provide the services, each of endpoint devices 100 may host computer code that when executed causes the endpoint devices to provide corresponding computer services. Additionally, the hardware and/or software configurations of endpoint devices 100 may impact the manner in which the computer implemented services are provided.

For example, modifying the computer code hosted by endpoint devices 100 may cause endpoint devices 100 to provide different types of computer implemented. The computer code may correspond to applications, virtual machines, containers, etc.

To manage the computer implemented services provided by endpoint devices 100, various entities may request that endpoint devices 100 provide certain types of computer implemented services. For example, a first entity may request that data storage services be provided and second entity may request that data processing services be provided. Based on these requests, endpoint devices 100 may update its operation to provide the requested computer implemented services.

However, if the entities requesting the services are separate from endpoint devices 100, then the requesting entities may lack information regarding the services provided by endpoint devices 100. Based on the lack of information, the entities may request changes to the computer implemented services that do not actually provide any benefits to the requesting entities or may be disadvantageous. Consequently, if the requests are fulfilled, endpoint devices 100 may reconfigure themselves in a manner that is disadvantageous.

Further, different requesting entities may (e.g., based on lack of information) request that endpoint devices 100 provide computer implemented services that are not synergistic with other services, conflict with the other services, and/or are problematic for other reasons. Consequently, if such requests are fulfilled, endpoint devices 100 may similarly reconfigure themselves in a manner that is disadvantageous.

Additionally, in distributed scenarios, different requesting entities may have different understandings regarding the services provided by endpoint devices 100. Consequently, requests from different requesting entities may be incongruent. Endpoint devices 100 may be unable to resolve how to implement multiple incongruent requests for computer implemented services.

In general, embodiments disclosed herein may provide methods, systems, and/or devices for managing the services provided by endpoint devices 100. To manage the services provided by endpoint devices, the endpoint devices and requesting entities may implement a state management model. The state management model may allow the endpoint devices to resolve incongruent requests from requesting entities.

The state management model may track three different states ascribed to endpoint devices. These three states may include a desired state, a configured state, and an actual state. The desired state may reflect an requesting entities desired state for an endpoint device. The configured state may reflect the state that an endpoint device is attempting to achieve. The actual state may reflect the state of the endpoint device as it exists.

To resolve incongruencies in requests from requesting entities, the endpoint devices may serve as the source of truth in the states ascribed to the endpoint devices. Thus, the states of the endpoint devices as understood by requesting entities may become stale over time. When a request from a requesting entities is received, the endpoint devices may identify whether the requesting entity's understanding of the configured state of the endpoint device matches the configured state of the endpoint device. If there is a difference in understanding, the endpoint device may reject the request. In contrast, if there is a same understanding, then the endpoint device may process the request. In other words, the endpoint device may reject requests from requesting entities that express a stale configured state of the endpoint device.

The requests from the requesting entities may specify desired states for the endpoint devices. If selected for processing, the endpoint devices may update their configured state to match the desired states specifies by the processed requests.

To attempt to implement the configured states, each of the endpoint devices may implement an automation engine. The automation engine may be tasked with modifying the configuration and/or applications hosted by the endpoint devices to place the actual state of the endpoint devices into alignment (e.g., to match) with the configured states of the endpoint devices.

However, this may not always be possible. To manage attempts to transition the actual state into alignment with the configured state, an endpoint device may classify the attempts to align these states. The classifications may reflect whether a state transition has been completed, and if not completed the classifications may explain why the state transition has not been completed.

Information regarding the classifications and states of endpoint devices may be distributed to various entities in a distributed system. In this manner, different entities in the system may align their views of the states of the endpoint devices.

By doing so, the functionality of endpoint devices in a distributed system may be managed while entities in the system have an incomplete understanding of the states of all of the components of the distributed system.

To provide the above noted functionality, the system of FIG. 1 may include endpoint devices 100 and management systems 110. Each of these components is discussed below.

Figure 2A:
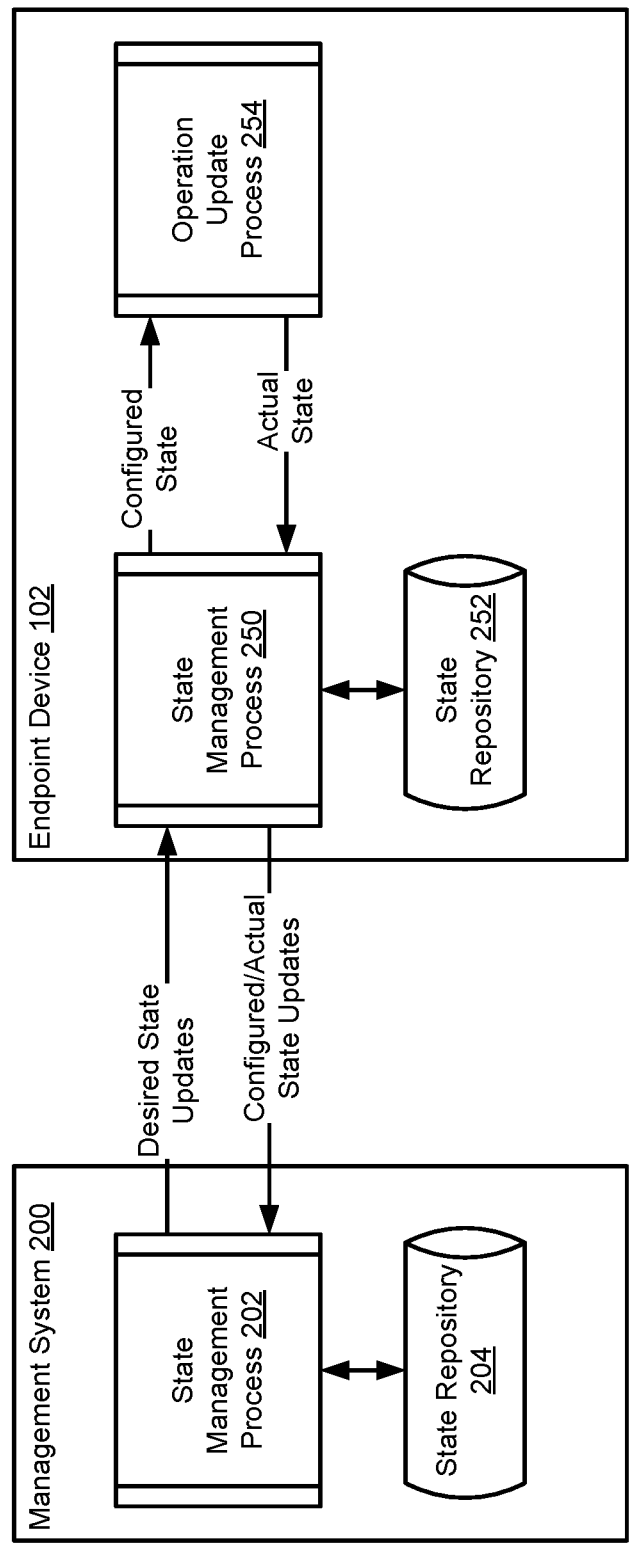
Figure 2B:
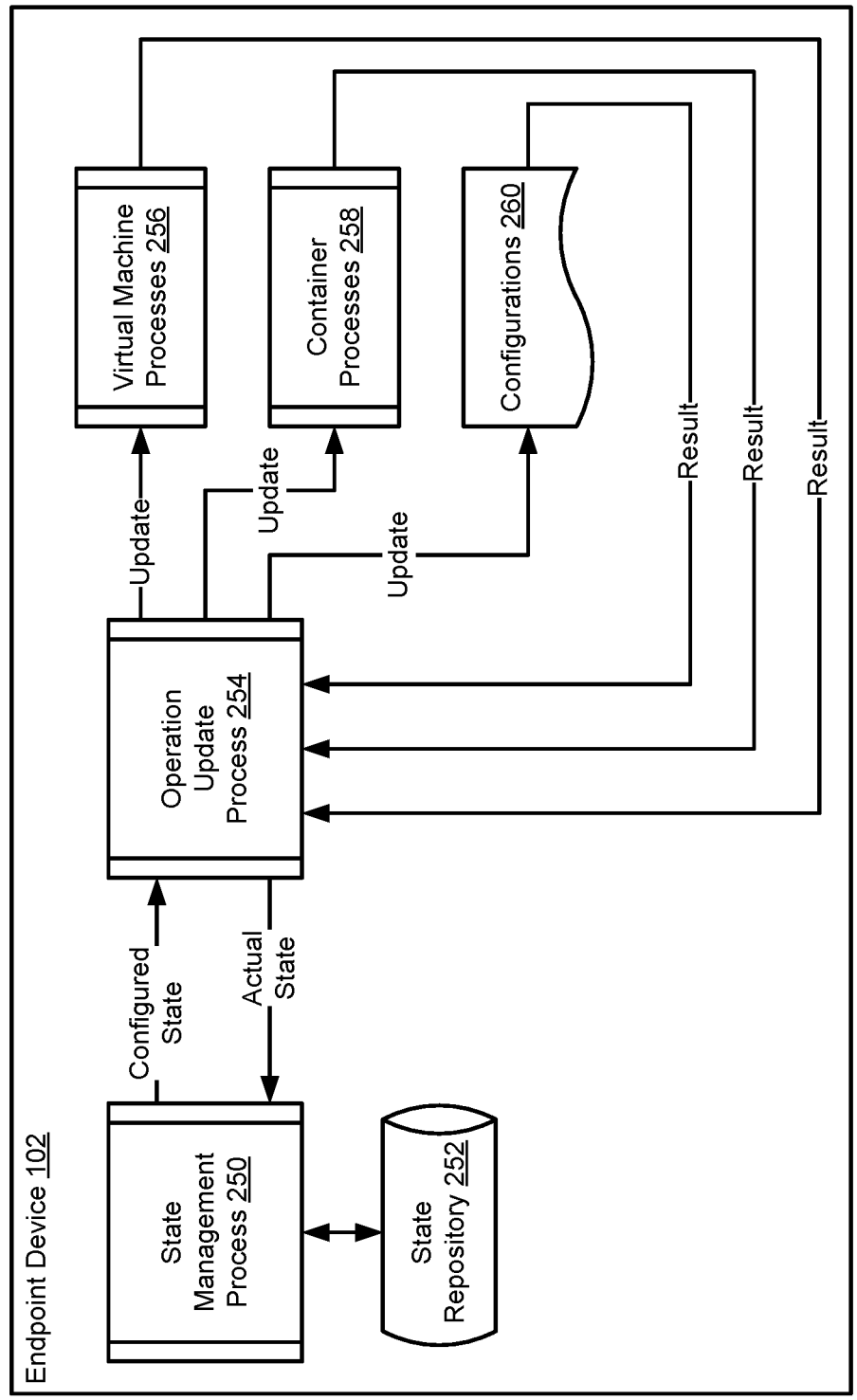

Endpoint devices 100 may provide computer implemented services. To provide the computer implemented services, endpoint devices 100 may manage its states using a state management model. When managing its state, an endpoint device may (i) obtain desired state updates from management systems 110 and/or other components, (ii) evaluate the desired state updates based on whether the desired state updates are based on an accurate understanding of the states of the endpoint device, (iii) for positively evaluated desired state updates, update its states based on the desired state updates, (iv) attempt to update its operation based on its states, and/or (iv) distribute information regarding its states and attempts to align its states to other entities such as management systems 110. By updating its state based on positively evaluated desired state updates, endpoint devices 100 may update their operation over time to provide desired computer implemented services while gracefully resolving conflicts between different requests to modify their states. Refer to FIGS. 2A-2C for additional details regarding updating the operation of endpoint devices 100.

Management systems 110 may manage the computer implemented services provided by endpoint devices 100. To do so, management systems 110 may (i) attempt to track the state of endpoint devices 100 based on a state model (e.g., that tracks the desired, configured, and actual states of endpoint devices 100, as well as state transition progress), (ii) generate and provide desired state updates to endpoint devices 100 (e.g., depending on the computer implemented services desired by management systems 110 and/or other entities), and (ii) attempt to resolve state transitions delays impacting endpoint devices 100. Refer to FIGS. 2A-2C for additional details regarding management of endpoint devices 100 by management systems 110.

Figure 3A:
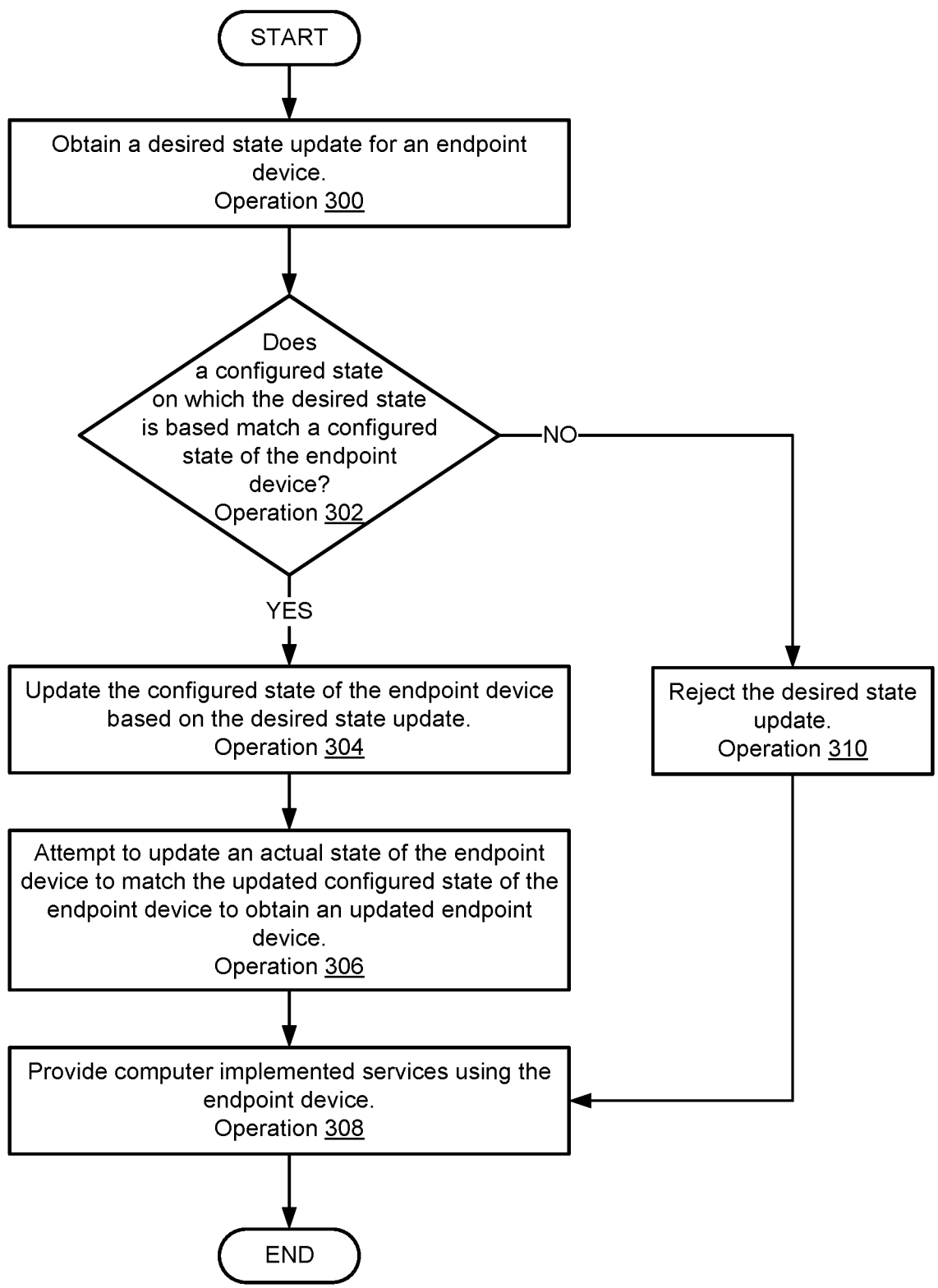
FIGS. 3A-3C show flow diagrams illustrating methods in accordance with an embodiment.
Figure 3B:
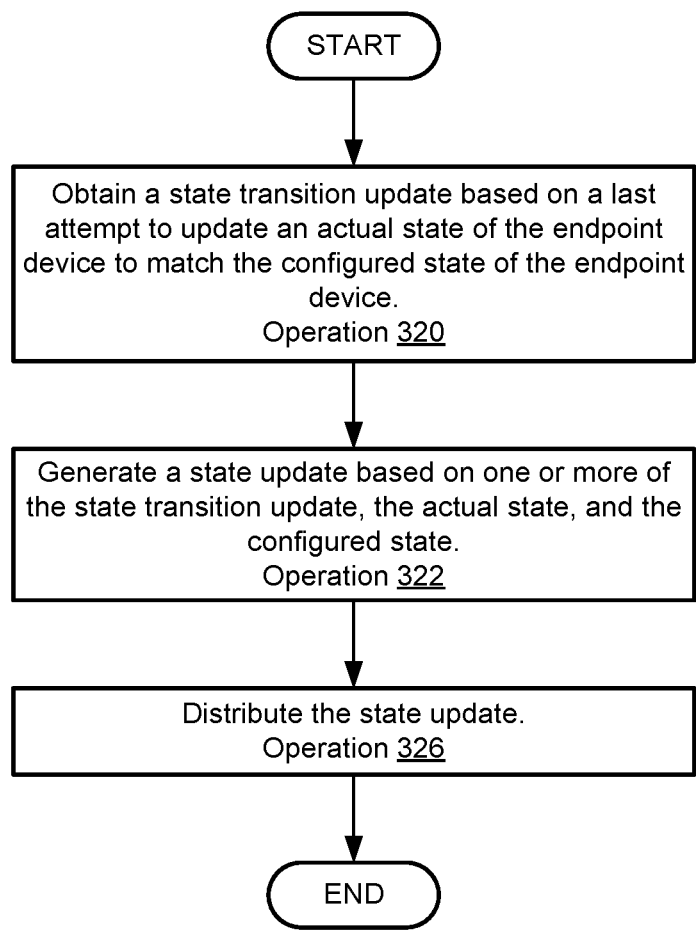
Figure 3C:
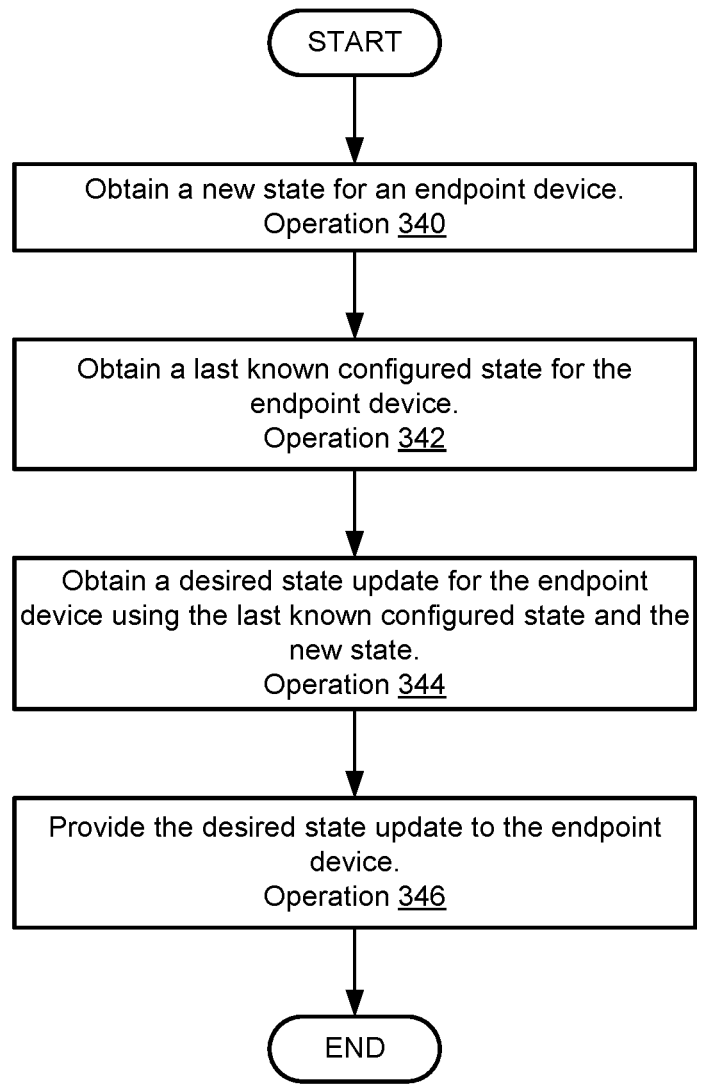

When providing their functionality, any of (and/or components thereof) endpoint devices 100 and/or management systems 110 may perform all, or a portion, of the methods illustrated in FIGS. 3A-3C.

Any of (and/or components thereof) endpoint devices 100 and management systems 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 270, 272, etc.) is used to represent data structure, a second set of shapes (e.g., 202, 250, etc.) is used to represent processes performed using and/or that generate data, and a third set of shapes (e.g., 204, 252, etc.) is used to represent large scale data structures such as databases.

Turning to FIG. 2A, a first data flow diagram in accordance with an embodiment is shown. The first data flow diagram may illustrate data used in and data processing performed in state management of endpoint devices.

To manage the state of an endpoint device (e.g., 102), management system 200 (e.g., which may be similar to any of management systems 110) may attempt to track the states of endpoint devices, and provide desired state updates to the endpoint device.

To attempt to track the state of endpoint device 102, management system 200 may solicit state updates from endpoint device 102. To do so, management system 200 may utilize any system through which state updates for endpoint device 102 may be obtained. For example, endpoint device 102 may implement a subscription service for state updates.

The state updates obtained by management system 200 may include configured state updates and actual state updates. These updates may indicate the configured and actual state of endpoint device 102, respectively.

When such updates are obtained by management system 200, state management process 202 performed by management system 200 may ingest and process the state updates to update a model of the states of endpoint device 102 maintained by management system 200. The state model may attempt to track the desired, configured, and actual state of endpoint device. However, the configured and actual state from the model may become stale over time.

To attempt to modify the computer implemented services provided by endpoint device 102, state management process 202 may generate and provide desired state updates to endpoint device 102. The desired state updates may express (i) a new state for endpoint device 102 as desired by management system 200, and (ii) an understanding of the configured and/or actual state of endpoint device 102 as understood by management system 200.

For example, a desired state update may specify a change to an existing configured state of endpoint device 102 as understood by management system 200. However, because the configured state of endpoint device 102 as understood by management system 200 may be stale, the resulting desired state update may be incongruent with respect to the configured and/or actual state of endpoint device 102.

Management system 200 may generate desired state updates based on (i) requests from users, (ii) information regarding attempted state transitions by endpoint devices (e.g., to resolve failed attempts), and/or on types of information. The desired state updates may be provided to endpoint device 102 by sending them via one or more messages.

Management system 200 may store information regarding the state and attempted state transitions of endpoint device 102 in state repository 204. State repository 204 may be implemented using a database or other data structure, and may include information regarding the states/attempted state transitions of any number of endpoint devices.

Once provided to endpoint device 102, state management process 250 may ingest the desired state updates. If the desired state updates express a configured state for endpoint device 102 that is consistent with the configured state of endpoint device 102 as understood by endpoint device 102, then endpoint device may deem the desired state updates as being valid and implement them. The desired state updates not deemed as valid may be rejected. In this manner, only management systems that have a consistent understanding of the configured state of endpoint device 102 may be able to modify the states of endpoint device 102. Consequently, incongruencies between state updates may be resolved through rejection of some of the state updates.

If rejected, state management process 250 may send information regarding the configured and/or actual state to management system 200.

If deemed valid, state management process 250 may update its configured state to reflect the desired state of management system 200. Once updated, state management process 250 may initiate propagation of the updated configured state to operation update process 254.

Operation update process 254 may ingest the updated configured state and initiate changes in endpoint device 102. The changes may be intended to update the actual state of endpoint device 102 to match the updated configured state.

The changes may include, for example, adding or removing instances of software entities (e.g., executing applications, drivers, operating systems, etc.), modifying configurations of hardware components and/or software entities, and/or otherwise modifying the manner in which endpoint device 102 operates.

The changes may be selected and implemented by an automation engine. The automation engine may use a set of rules (e.g., set by a subject matter expert) or other criteria to identify actions that are likely to modify the actual state of endpoint device 102 to match the configured state of endpoint device 102.

As changes are made by operation update process 254 (e.g., via an automation engine), the actual state of endpoint device 102 may be updated. For example, the actual state may be provided to state management process 250, which may update the representation of the actual state as stored in state repository 252 as part of a state model.

In contrast to the state model maintained by management system 200 (which may attempt to track the desired, configured, and actual state), the state model maintained by endpoint device 102 may only track the configured and actual states of endpoint device 102. For example, if desired state updates are found to be valid, then the configured state may be updated. Otherwise, information regarding desired states may not be retained by endpoint device 102.

In addition to information regarding changes in the actual state of endpoint device 102, operation update process 254 may also monitor attempt to update the actual state to match the configured state. Information regarding these attempts may be used to establish a classification for the transition of an actual state to match an updated configured state.

For example, while the actual state does not match the configured state, information regarding actions performed to modify the actual state to match the configured state may be recorded and used to identify whether (i) the actual and configured state match (e.g., classified as a successful state transition), (ii) the actual and configured state do not match but continued progress is made (e.g., classified as an in process state transition), and (iii) the actual and configured state do not match but no progress is being made (e.g., classified as a failed state transition). No progress may be being made when, for example, an error occurs, a condition is encountered that is not addressed by the rules used to select actions to perform to modify the actual state, and/or for other reasons. In other words when a failed state transition is identified, it is expected that no additional progress will be made in matching the actual state to the configured state unless an outside intervention is performed. Refer to FIG. 2B for additional details regarding modifying the actual state to match the configured state of endpoint device 102.

When state updates are provided by state management process 250 to other entities, the state updates may include information regarding the actual and configured state as well as the classification for any current state transition that is being carried out. In this manner, entities such as management system 200 may obtain additional information upon which new desired state updates may be generated. For example, in the event that a state transition is classified as a failed state transition, management system 200 may identify which portions of the configured state of endpoint device 102 that endpoint device 102 is unable to update the actual state to match. Management system 200 may use this information to generate a desired state update that that changes these portions of the configured state such that endpoint device 102 will be more likely to be able to transition the actual state to match the configured state.

Turning to FIG. 2B, a second data flow diagram in accordance with an embodiment is shown. The second data flow diagram may illustrate data used in and data processing performed in modification of the actual state of endpoint device 102 to match the configured state.

To update the actual state of endpoint device 102, operation update process 254 may invoke use of an automation engine to select actions to perform. These actions may include making various updates to virtual machine processes 256, container processes 258, and configurations 260.

Virtual machine processes 256 may include process performed by virtual machine and processes performed to support execution of virtual machines. The virtual machines may facilitate all or a portion of the computer implemented services provided by endpoint device 102. Virtual machine processes 256 may be updated by (i) instantiating or terminating virtual machine instances, (ii) modifying resource allocations to virtual machine instances, and/or perform other actions to modify the operation of virtual machines.

Container processes 258 may include process performed by containers and processes performed to support execution of containers. The containers, like the virtual machines, may facilitate all or a portion of the computer implemented services provided by endpoint device 102. Container processes 258 may be updated by (i) instantiating or terminating container instances, (ii) modifying resource allocations to the container instances, and/or perform other actions to modify the operation of containers.

Configurations 260 may include configuration settings for various hardware components and/or software entities. Configurations 260 may be updated by modifying the content of the data structures, invoking functions of corresponding applications to modify configuration settings that may be protected from external modification, and/or via other methods.

While illustrated with respect to virtual machine and container processes, it will be appreciated that processes corresponding to other types of software entities may be similarly updated.

When any of the processes 256, 258 and configuration 260 are updated, the results from the updates may be obtained and used to identify changes to the actual state of endpoint device 102. For example, results reflecting successfully instantiated or terminated virtual machines/containers as part of updates made by operation update process 254 may be used to identify an updated actual state of endpoint device 102. Consequently, the actual state provided to state management process 250 may be an accurate reflection of the current state of endpoint device 102.

The results may also be used to classify attempted state transitions performed by endpoint device 102.

Turning to FIG. 2C, a third data flow diagram in accordance with an embodiment is shown. The third data flow diagram may illustrate data used in and data processing performed in classifying attempted state transitions.

To classify a state transition, state transition classification process 276 may be performed. During transition classification process 276, configured state 270, actual state 272, and results 274 may be ingested and used to obtain state transition classification 278.

To obtain state transition classification 278, results 274 may be compared to actual state 272 to identify whether any progress towards conforming actual state 272 to configured state 270 has been made by virtue of one or more actions the were performed and caused results 274 to be generated. For example, if results 274 do not indicate that actual state 274 has changed, then it may be concluded that no progress has been made in conforming actual state 272 to configured state 270. The number of actions performed without progress being made may be compared to a number of actions to ascertain whether to classify the attempt as being in-progress (e.g., not exceeding the number) or failed (e.g., exceeds the number). The number may be a threshold that may be prescribed ahead of time, dynamically updated over time, etc. Additionally, the threshold may vary depending on the type of actions being performed.

For example, some types of actions (e.g., attempts made to instantiate software) may have lower numbers as basis for comparison than other types of actions (e.g., attempts to resolve performance level issues such as rates of processing data).

The resulting state transition classification 278 may be based on whether progress has been made (e.g., in progress), or not (e.g., failed), or if the actual state 272 is conformed to configured state 270 (e.g., successful).

Thus, using the method illustrated in FIG. 2C, classifications for state transition may be obtained. The state transitions may be provided along with information regarding states to other entities so that the other entities may make better decisions regarding how to construct desired state updates. Consequently, endpoint devices may be more likely to be able to conform actual states to configured states thereby causing the endpoint devices to provide desired computer implemented services.

As discussed above, the components of FIG. 1 may perform various methods to manage the operation of endpoint devices. FIGS. 3A-3C illustrate methods that may be performed by the components of the system of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method for providing computer implemented services in accordance with an embodiment is shown. The method may be performed by any of endpoint devices 100, management systems 110, and/or other components of the system shown in FIG. 1.

Prior to operation 300, an endpoint device may obtain a configuration state and update its operation to conform the actual state of the endpoint device to match the configured state. Information regarding the actual and/or configured state may be distributed to any number of management systems and/or other devices.

At operation 300, a desired state update for the endpoint device is obtained. The desired state update may be obtained by reading it from storage, receiving it via a message from another devices, by generating it, and/or via other methods. The other device may be a management system and/or another device. The other device may have a consistent or stale view of the configured and/or actual state of the endpoint device.

At operation 302, a determination is made regarding whether a first configured state on which a desired state specified by the desired state update matches the configured state of the endpoint device. The determination may be made by comparing the first configured state to the configured state of the endpoint device. The comparison may indicate whether the two match.

The determination may also be made using criteria that define when a match is made. The criteria may allow for variance of the first configured state from the configured state of the endpoint device. The amount of acceptable variance may be defined, for example, on a percentage basis or other criteria.

The first configured state may be specified directly by the desired state update (e.g., specifies the state) or indirectly. To indirectly specify the first configured state, the desired state update may include information regarding, for example, an end goal state, changes between the first configured state and the end goal state, and/or the first configured state.

If the first configured state matches the configured state of the endpoint device, then the method may proceed to operation 304. Otherwise, the method may proceed to operation 310.

At operation 304, the configured state of the endpoint device is updated based on the desired state update. The configured state may be updated by modifying the configured state to match all, or a portion, of the first configured state specified by the desired state update.

At operation 306, an attempt to update the actual state of the endpoint device is made to match the updated configured state of the endpoint device to obtain an updated endpoint device. The attempt may or may not be successful. The attempt may be made by providing information regarding the updated configured state to an automation engine. The automation engine may select one or more actions to perform. The actions may include, for example, instantiation and/or termination of software entities (e.g., virtual machines, containers, etc.), modification of configuration settings, etc. The actions may be performed which may or may not conform the actual state of the endpoint device to the configured state.

If unsuccessful, additional actions may be performed to attempt to conform the actual state to the configured state. The number of times additional actions are selected and performed may be tracked. The number of times may be compared to criteria that may limit the number of attempts that may be made to conform the actual state to the configured state.

A state transition update may be obtained based on the attempt to update the actual state of the endpoint device. The state transition update may be obtained using the number of attempts that have been made as well as whether the actual state matches the configured state.

Once obtained, an endpoint side state update may be generated based on the state transition update, the updated configured state, the actual state, and, in an instance of the attempting to update where the actual state was successfully updated to obtain an updated actual state, the updated actual state. The endpoint side state update may be obtained by adding the aforementioned information to a data structure.

Once obtained, the endpoint side state update may be distributed to a control plane element, such as a management system, a manager of a management system, an intermediate element that may distribute the endpoint side state update to other entities, etc. The endpoint side state update may be distributed by providing a copy of and/or information regarding the endpoint side state update to the control plane element.

At operation 308, computer implemented services are provided using the endpoint device. The computer implemented services may include any number and type of services. The method may end following operation 308.

Returning to operation 302, the method may proceed to operation 310 following operation 302.

At operation 310, the desired state update is rejected. The desired state update may be rejected by discarding it without updating the configured state, by sending a notification to the entity that established the desired state, and/or by performing other actions.

Additionally, an endpoint side state update may be provided to the entity that generated the desired state update. By providing the entity with the endpoint side state update, the entity may update its understanding of the configured and/or actual state of the endpoint device.

Thus, using the method illustrated in FIG. 3A, embodiments disclosed herein may facilitate distributed management of endpoint devices by reconciling incongruent desired state updates. To reduce the likelihood of receiving incongruent desired state updates, endpoint devices may distribute information regarding their states.

Turning to FIG. 3B, a flow diagram illustrating a method for distributing state updates for endpoint devices in accordance with an embodiment is shown. The method may be performed by any of endpoint devices 100, management systems 110, and/or other components of the system shown in FIG. 1.

At operation 320, a state transition update based on a last attempt to update an actual state of the endpoint device to match the configured state of the endpoint devices is obtained. The state transition update may be obtained similarly to as described with respect to operation 306.

At operation 322, a state update is generated based on one or more of the state transition update, the actual state, and the configured state. The state update may be an endpoint side state update. The endpoint side state update may be generated by adding the aforementioned information to a data structure.

At operation 324, the state update is distributed. The state update may be distributed by providing a copy of the state update to one or more devices. The devices may include management systems (and/or other type of control plane entities), other endpoint devices, and/or other types of devices. The specific devices to which the state update is provided may be selected based on a distribution list. The distribution list may specify entities interested in state updates that include specific content (e.g., successful state transitions, failed state transitions, in-process state transitions, etc.). Thus, the entities to which state updates are distributed may vary over time. For example, a specific management entity tasked with managing failures in conforming actual states to configured states may be listed in the distribution list as only being interested in state updates that indicate failed and/or in-process state transitions.

The method may end following operation 326.

Using the method shown in FIG. 3B, embodiments disclosed herein may update a distributed understanding of the states of endpoint devices. Consequently, other devices may be able to accurately identify relevant changes that may be made to the state of the endpoint device.

Turning to FIG. 3C, a flow diagram illustrating a method for updates the states of endpoint devices in accordance with an embodiment is shown. The method may be performed by any of endpoint devices 100, management systems 110, and/or other components of the system shown in FIG. 1.

At operation 340, a new state for an endpoint device is obtained. The new state may be obtained by receiving user input regarding the new state, by reading the new state from storage, by receiving the new state from another device, and/or via other methods.

If input regarding the new state is received, the user input may reflect desired services to be provided to the user that provided the user input. The user input may be translated into the new state using a set of rules that defines states in terms of desired computer implemented services, and/or via other conversion mechanisms.

At operation 342, a last known configured state for the endpoint device is obtained. The last known configured state may be obtained by reading it from storage, by obtaining it from another device, and/or via other methods.

At operation 344, a desired state update for the endpoint device is obtained using the last known configured state and the new state. The desired state update may be obtained by populating a data structure with changes from the last known configured state to attain the new state, information regarding the new state, and/or information regarding the last known configured state. Thus, depending on the content of the data structure, the configured state as known by a requesting device (e.g., a management system, another endpoint device, etc.) may be either directly or indirectly specified by the content.

At operation 346, the desired state update is provided to the endpoint device. The desired state update may be provided by sending a copy of the desired state update to the endpoint device via a message, and/or via other mechanisms (e.g., publish/subscribe systems, through intermediate entities, etc.).

The method may end following operation 346.

Thus, using the method illustrated in FIG. 3C, desired state updates may be generated and provided to endpoint devices to update the computer implemented services provided by the endpoint devices.

Figure 4:
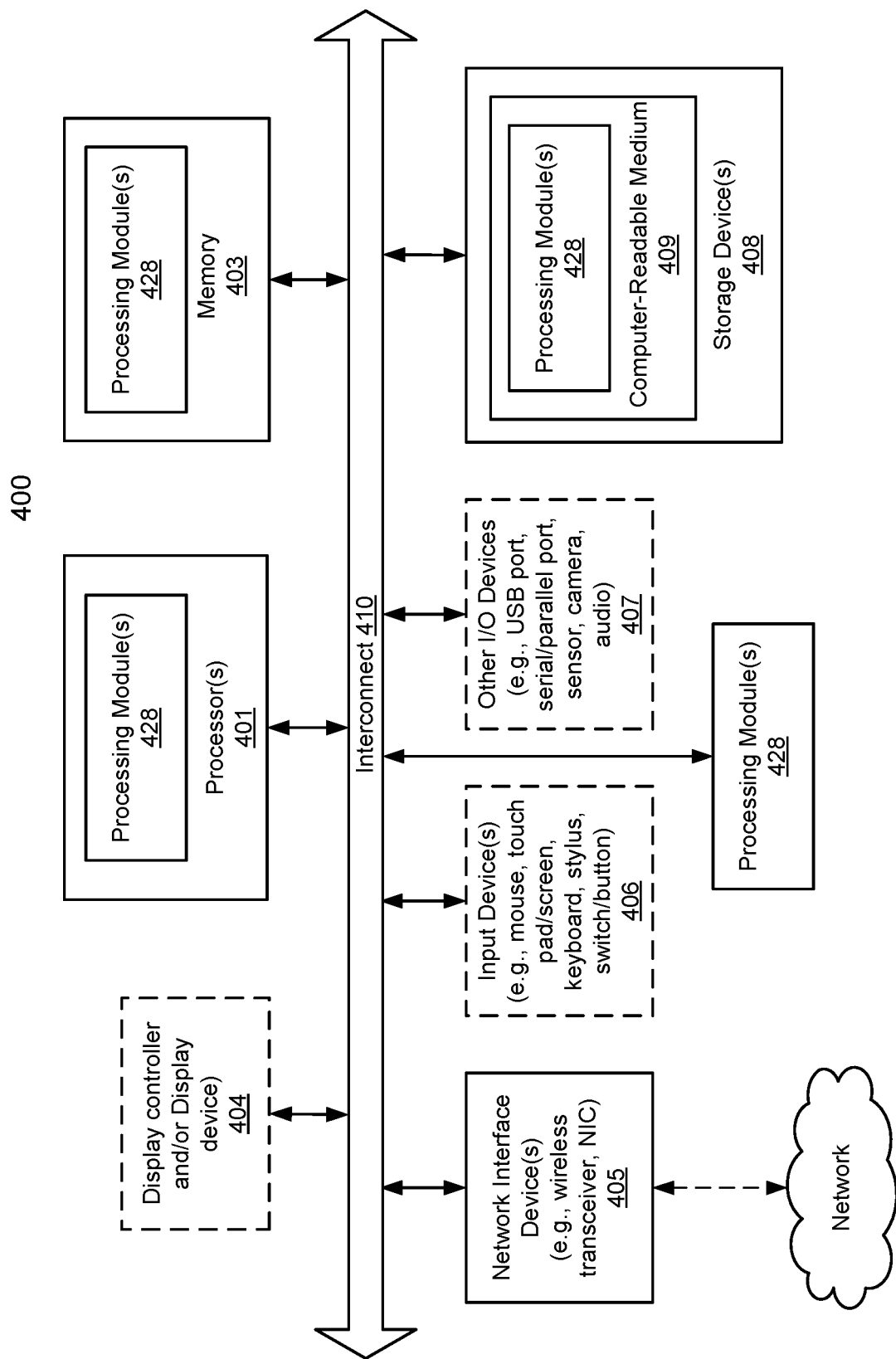
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device, the method comprising:
    by a processor the endpoint device:
        obtaining a configuration state for the endpoint device and instantiating a process of updating an actual state of the endpoint device to match a second configured state of the endpoint device specified in the configuration state;
        obtaining, after obtaining the configuration state and while the endpoint device is in the process of updating the actual state to the second configured state, a desired state update for the endpoint device, the desired state update being separate from the configuration state;
        making a determination regarding whether a first configured state on which the desired state update is based matches the second configured state of the endpoint device;
        in a first instance of the determination where the first configured state on which the desired state update is based matches the second configured state of the endpoint device:

updating the second configured state based on the first configured state to obtain an updated second configured state;

updating a current configuration state of the endpoint device to match the updated second configured state of the endpoint device to obtain an updated endpoint device by using the processor of the endpoint device to at least instantiate or terminate one or more software entities of the endpoint device or modify one or more configuration settings of the endpoint device, the current configuration state being based on a state of the process of updating the actual state to match the second configured state at a point that the endpoint device is now being updated to match the updated second configured state instead of the second configured state; and providing computer implemented services to users of the endpoint device using at least one or more hardware components of the updated endpoint device, the one or more hardware components comprising the processor, a hardware storage, and physical network interface of the updated endpoint device.

2. The method of claim 1, further comprising, by the endpoint device:

in a second instance of the determination where the first configured state on which the desired state update is based does not match the second configured state of the endpoint device:

rejecting the desired state update to retain the second configured state; and providing the computer implemented services using the endpoint device in the actual state.

3. The method of claim 1, further comprising, by the endpoint device:

obtaining a state transition update based on the updating of the actual state of the endpoint device to match the updated second configured state;

generating an endpoint side state update based on one or more of the state transition update, the updated second configured state, the actual state, and, in an instance of the updating of the actual state of the endpoint device to match the updated second configured state where the actual state was successfully updated to obtain an updated actual state, the updated actual state; and distributing the state update to a control plane element.

4. The method of claim 1, wherein the actual state reflects states of hardware and/or software components of the endpoint device, and the endpoint device comprises a state repository in which the actual state of the endpoint device is stored, the state repository being a database configured within a storage of the endpoint device.

5. The method of claim 1, wherein the first configured state reflects a desired state of hardware and/or software components of the endpoint device, the determination regarding whether the first configured state on which the desired state update is based matches the second configured state of the endpoint device is made by the endpoint device to determine, by the endpoint device and before the endpoint device is updated to the updated endpoint device, that the desired state update is not provided by another computing device with a stale understanding of the current configuration state of the endpoint device.

6. The method of claim 5, wherein the endpoint device comprises an automation engine adapted to cause the endpoint device to, based on the endpoint device's own determination regarding the state of the hardware and/or software components of the endpoint device, instantiate a modification of the state of the hardware and/or software components of the endpoint device to match the desired state of the hardware and/or software components of the endpoint device.

7. The method of claim 1, wherein the desired state update specifies a change to the first configured state, and the first configured state is a last known configured state of the endpoint device as known by an entity that generated the desired state update.

8. The method of claim 7, wherein the determination is made based on validation rules that require the last known configured state of the endpoint device as known by an entity that generated the desired state update to reflect the second configured state of the endpoint device for the desired state update to be a valid update.

9. A non-transitory machine-readable medium having instructions stored therein, which when executed by at least one processor, cause a system to perform system first operations for managing operation of an endpoint device, the system first operations comprising:

by the endpoint device:

obtaining a configuration state for the endpoint device and instantiating a process of updating an actual state of the endpoint device to match a second configured state of the endpoint device specified in the configuration state;

obtaining, after obtaining the configuration state and while the endpoint device is in the process of updating the actual state to the second configured state, a desired state update for the endpoint device, the desired state update being separate from the configuration state;

making a determination regarding whether a first configured state on which the desired state update is based matches a second configured state of the endpoint device;

in a first instance of the determination where the first configured state on which the desired state update is based matches the second configured state of the endpoint device:

updating the second configured state based on the first configured state to obtain an updated second configured state;

updating a current configuration state of the endpoint device to match the updated second configured state of the endpoint device to obtain an updated endpoint device by using the processor of the endpoint device to at least instantiate or terminate one or more software entities of the endpoint device or modify one or more configuration settings of the endpoint device, the current configuration state being based on a state of the process of updating the actual state to match the second configured state at a point that the endpoint device is now being updated to match the updated second configured state instead of the second configured state; and providing computer implemented services to users of the endpoint device using at least one or more hardware components of the updated endpoint device, the one or more hardware components comprising the processor, a hardware storage, and physical network interface of the updated endpoint device.

10. The non-transitory machine-readable medium of claim 9, wherein the operations further comprise, by the endpoint device:
   in a second instance of the determination where the first configured state on which the desired state update is based does not match the second configured state of the endpoint device:
      rejecting the desired state update to retain the second configured state; and
      providing the computer implemented services using the endpoint device in the actual state.

11. The non-transitory machine-readable medium of claim 9, wherein the operations further comprise, by the endpoint device:
   obtaining a state transition update based on the updating of the actual state of the endpoint device to match the updated second configured state;
   generating an endpoint side state update based on one or more of the state transition update, the updated second configured state, the actual state, and, in an instance of the updating of the actual state of the endpoint device to match the updated second configured state where the actual state was successfully updated to obtain an updated actual state, the updated actual state; and
   distributing the state update to a control plane element.

12. The non-transitory machine-readable medium of claim 9, wherein the actual state reflects states of hardware and/or software components of the endpoint device.

13. The non-transitory machine-readable medium of claim 9, wherein the first configured state reflects a desired state of hardware and/or software components of the endpoint device.

14. The non-transitory machine-readable medium of claim 13, wherein the endpoint device comprises an automation engine adapted to cause the endpoint device to, based on the endpoint device's own determination regarding the state of the hardware and/or software components of the endpoint device, instantiate a modification of the state of the hardware and/or software components of the endpoint device to match the desired state of the hardware and/or software components of the endpoint device.

15. The non-transitory machine-readable medium of claim 9, wherein the desired state update specifies a change to the first configured state, and the first configured state is a last known configured state of the endpoint device as known by an entity that generated the desired state update.

16. The non-transitory machine-readable medium of claim 15, wherein the determination is made based on validation rules that require the last known configured state of the endpoint device as known by an entity that generated the desired state update to reflect the second configured state of the endpoint device for the desired state update to be a valid update.

17. An endpoint device, comprising:
   a processor; and
   a memory coupled to the processor to store instructions, which when executed by the processor, cause the endpoint device to perform operations for managing operation of the endpoint device, the operations comprising:
      obtaining a configuration state for the endpoint device and instantiating a process of updating an actual state of the endpoint device to match a second configured state of the endpoint device specified in the configuration state;
      obtaining, after obtaining the configuration state and while the endpoint device is in the process of updating the actual state to the second configured state, a desired state update for the endpoint device, the desired state update being separate from the configuration state;
      making a determination regarding whether a first configured state on which the desired state update is based matches a second configured state of the endpoint device;
      in a first instance of the determination where the first configured state on which the desired state update is based matches the second configured state of the endpoint device:
         updating the second configured state based on the first configured state to obtain an updated second configured state;
         updating a current configuration state of the endpoint device to match the updated second configured state of the endpoint device to obtain an updated endpoint device by using the processor of the endpoint device to at least instantiate or terminate one or more software entities of the endpoint device or modify one or more configuration settings of the endpoint device, the current configuration state being based on a state of the process of updating the actual state to match the second configured state at a point that the endpoint device is now being updated to match the updated second configured state instead of the second configured state; and
         providing computer implemented services to users of the endpoint device using at least one or more hardware components of the updated endpoint device, the one or more hardware components comprising the processor, a hardware storage, and physical network interface of the updated endpoint device.

18. The endpoint device of claim 17, wherein the operations further comprise:
   in a second instance of the determination where the first configured state on which the desired state update is based does not match the second configured state of the endpoint device:
      rejecting the desired state update to retain the second configured state; and
      providing the computer implemented services using the endpoint device in the actual state.

19. The endpoint device of claim 17, wherein the operations further comprise:
   obtaining a state transition update based on the updating of the actual state of the endpoint device to match the updated second configured state;
   generating an endpoint side state update based on one or more of the state transition update, the updated second configured state, the actual state, and, in an instance of the updating of the actual state of the endpoint device to match the updated second configured state where the actual state was successfully updated to obtain an updated actual state, the updated actual state; and
   distributing the state update to a control plane element.

20. The endpoint device of claim 17, wherein the actual state reflects states of hardware and/or software components of the endpoint device.

\* \* \* \* \*